United States Patent [19]

Kono et al.

[11] 4,324,745
[45] Apr. 13, 1982

[54] DEVICE FOR AUTOMATICALLY REGULATING A CHOKE VALVE IN A CARBURETOR FOR AN INTERNAL COMBUSTION ENGINE

[75] Inventors: Yasuaki Kono, Aichi; Hisaharu Arai, Nagoya, both of Japan

[73] Assignee: Aisan Kogyo Kabushiki Kaisha, Japan

[21] Appl. No.: 168,699

[22] Filed: Jul. 14, 1980

[30] Foreign Application Priority Data

Oct. 6, 1979 [JP] Japan ............................ 54-129262

[51] Int. Cl.³ ........................................... G05D 23/00
[52] U.S. Cl. ............................. 261/39 E; 236/68 B; 236/101 D
[58] Field of Search ............... 236/68 R, 68 B, 101 C, 236/101 D; 261/39 E; 337/102, 103, 324; 29/173

[56] References Cited

U.S. PATENT DOCUMENTS

| | | | |
|---|---|---|---|
| 1,848,653 | 3/1932 | Persons | 236/68 R |
| 3,147,354 | 9/1964 | Hewitt, Jr. | 236/68 R X |
| 3,905,346 | 9/1975 | Freismuth et al. | 261/39 E X |
| 3,972,311 | 8/1976 | De Petris | 261/39 E X |
| 4,050,427 | 9/1977 | Hollins | 261/39 E X |
| 4,081,499 | 3/1978 | Ishii et al. | 236/101 C X |
| 4,083,336 | 4/1978 | Armstrong et al. | 261/39 E |
| 4,152,377 | 5/1979 | Takata | 236/101 C X |
| 4,175,695 | 11/1979 | Cresswell | 236/68 R X |
| 4,201,735 | 5/1980 | Byam | 261/39 E |
| 4,218,406 | 8/1980 | Detweiler | 261/39 E X |

Primary Examiner—William E. Tapolcai, Jr.
Attorney, Agent, or Firm—Blair, Brown & Kreten

[57] ABSTRACT

Disclosed herein is a device for automatically regulating a choke valve mounted in a carburetor. The device comprises a housing fixed to the body of a carburetor, a bimetal coil provided in the housing and connected to a choke valve shaft urging the choke valve to a closed or open position, an electric heater device located adjacent to the bimetal coil, and a heat conductive member interposed between the bimetal coil and the heater device. Each surface of the heat conductive member is kept in contact with both the heater device and the bimetal coil. Particularly, the bimetal coil is formed in a conical shape and mounted on a retainer, thus being operable to press the heat conductive member with its compressive spring force so as to receive the heat output from the heater device efficiently and quickly by direct heat conduction.

1 Claim, 14 Drawing Figures

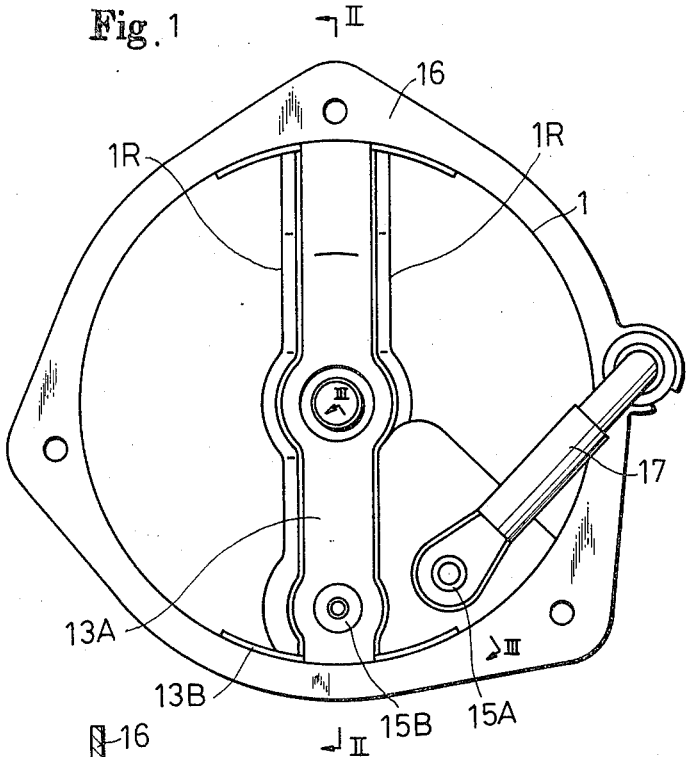
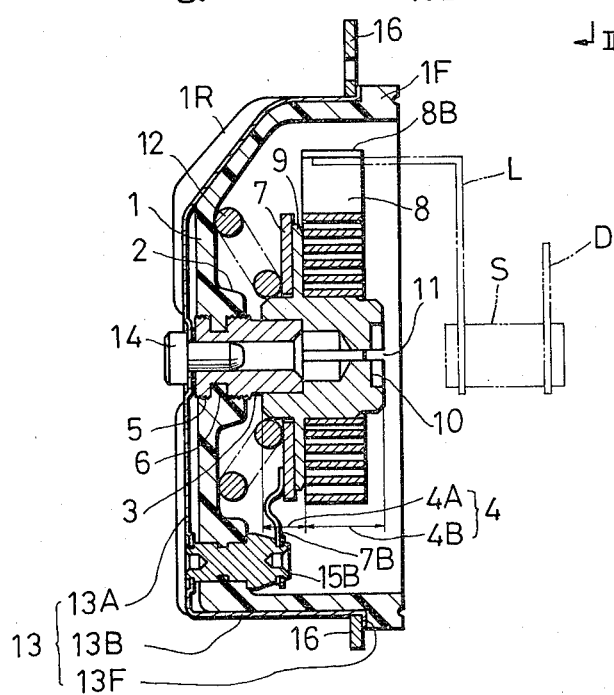
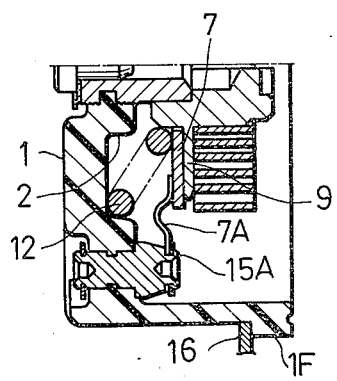

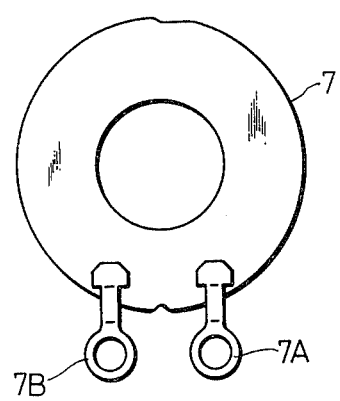
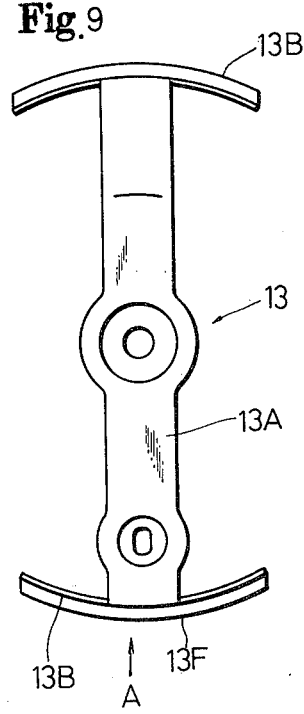
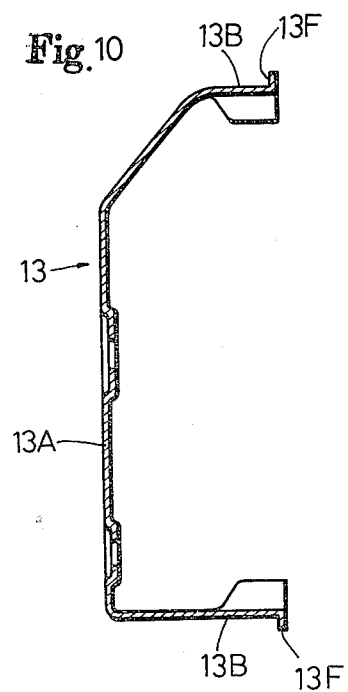
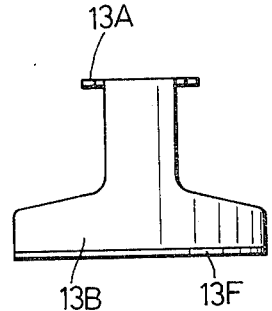

DEVICE FOR AUTOMATICALLY REGULATING A CHOKE VALVE IN A CARBURETOR FOR AN INTERNAL COMBUSTION ENGINE

BACKGROUND OF THE INVENTION

1. Field of the Invention

The present invention relates to a device for automatically regulating a choke valve in a carburetor for an internal combustion engine, and more particularly, to a device for automatically regulating opening and closing of the choke valve by deformation of a bimetallic member connected to the shaft of the choke valve by heat from an electric heater.

2. Description of the Prior Art

In recent years, there has been required in the field of the automotive industry provision of a quick-opening choke valve following tightening of exhaust gas control.

In general, a device for automatically regulating a choke valve in a carburetor comprises a housing in which an electric heater and a bimetallic member are coaxially provided so that the bimetallic member is deformed by heat transferred from the heater. However, in a conventional device, the heater and the bimetallic member are oppositely provided to define a clearance therebetween, and since the heat is transferred to the bimetallic member as radiant heat across the clearance, temperature change of the bimetallic member cannot follow that of the heater to retard regulation of the choke valve, and it is not possible to facilitate quick-opening of the choke valve.

To solve this problem, there has been provided a device in which capacity of the heater is increased, though, it leads to waste of electricity, and in an extreme case, a means for preventing overheating of the device is required, leading to complicated construction of the device.

SUMMARY OF THE INVENTION

It is an object of the present invention to overcome the aforementioned disadvantages of the prior art by providing a device for automatically regulating a choke valve in a carburetor for an internal combustion engine in which heat is positively transferred to a bimetallic member so that the choke valve is opened and closed in response to temperature change of the heater.

It is another object of the present invention to provide a device for automatically regulating a choke valve in a carburetor for an internal combustion engine in which the housing is effectively cooled by outward discharging of heat so that overheating of the device is prevented when the automobile to which the internal combustion engine is applied is driven and the bimetallic member is restored from deformation following cooling of the engine after the automobile is stopped to make the choke valve positively opened and closed in response to temperature change of the heater.

According to the present invention, there is provided a device for automatically regulating a choke valve in an internal combustion engine which comprises a housing, an electric heater, a bimetallic member in the form of a conical coiled spring to be deformed by heat for regulating the choke valve and a medium interposed between the heater and the bimetallic member. The bimetallic member is pressed against the medium by spring force in its axial direction so that heat is transferred by heat conduction to the bimetallic member from the heater, which, in turn, is maintained in a fixed state. Since the heater, the medium and the bimetallic member contact one another without defining any clearance, the temperature change of the heater is transferred to the bimetallic member through the medium by heat conduction. Thus, the bimetallic member is deformed in response to the temperature change of the heater to open and close the choke valve, thereby enables quick-opening of the choke valve and facilitates effective use of the heat to decrease capacity of the heater.

In this device, further, the medium protects the heater to prevent it from abrasion by thermal deformation of the bimetallic member and increase durability thereof.

According to the present invention, there is also provided a device for automatically regulating a choke valve in an internal combustion engine which comprises a housing, an electric heater, a bimetallic member in the form of a conical coiled spring to be deformed by heat for regulating the choke valve and a medium interposed between the heater and the bimetallic member. The bimetallic member is pressed against the medium by spring force in its axial direction so that heat is transferred by heat conduction to the bimetallic member from the heater, which, in turn, is maintained in a fixed state, and the device further includes a cooling member provided on the outer surface of the housing. Therefore, the housing is effectively cooled by outward discharging of heat so that overheating of the device is prevented when the automobile to which the internal combustion engine is applied is driven and the bimetallic member is restored from deformation following cooling of the engine after the automobile is stopped to make the choke valve positively opened and closed in response to temperature change of the heater, thereby making construction of the device simple.

BRIEF EXPLANATION OF THE DRAWINGS

FIG. 1 is a front elevational view of the first embodiment of the device according to the present invention;

FIG. 2 is a cross sectional view taken along lines II—II in FIG. 1;

FIG. 3 is a cross sectional view taken along lines III—III in FIG. 1;

FIG. 7 is a front elevational view of the electric heater;

FIG. 8 is a central cross sectional view of the electric heater as shown in FIG. 7;

FIG. 9 is a front elevational view of the cooling member;

FIG. 10 is a central cross sectional view of the cooling member as shown in FIG. 9;

FIG. 11 is an illustrative view of the cooling member as shown in the direction indicated by an arrow A in FIG. 9.

DESCRIPTION OF THE PREFERRED EMBODIMENTS

Figure 4:
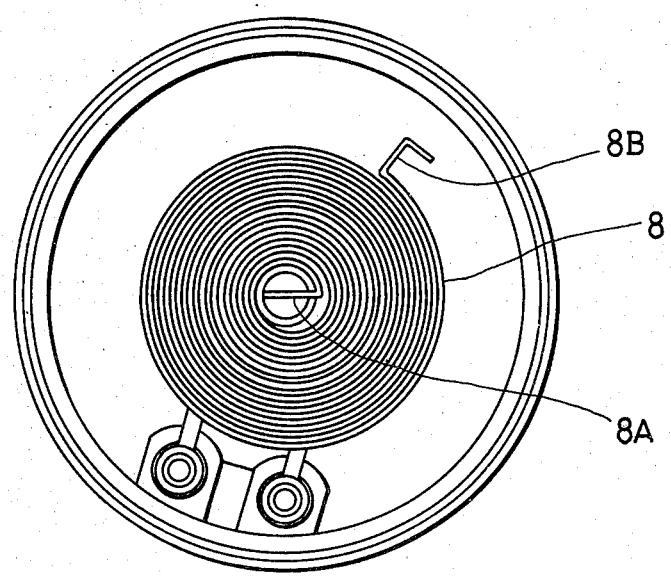
FIG. 4 is a rear elevational view of the principal part of the device according to the present invention.

Referring now to FIGS. 1 to 11 of the drawings in which an embodiment of the present invention is shown, a rotating shaft S as shown in phantom lines in FIG. 2 is connected at one end with a driving lever D which functions to open and close a choke valve (not shown). A working lever L for transmitting thermal deformation of a bimetallic member 8 is secured at its base portion to the other end of the rotating shaft S.

Adjacent to the rear portion of the working lever L, there is provided a substantially circular bowl-shaped housing 1. The housing 1 is made by injection molding of heat resisting synthetic resin such as phenolic resin and rigid vinyl chloride, and is provided with a flange 1F projecting outwardly from its outer periphery and a pair of reinforcing ribs 1R provided in its front center. In the inner central portion of the housing 1, there is provided a thick boss 2 which has an inwardly-projecting cylindrical holder 3 for supporting a collar 4 as hereinafter described. The holder 3 is made of metal such as aluminum, iron and brass, and in construction, the holder 3 has a plurality of notches 5 formed in the outer surface of its rear end by knurling and an annular groove 6 which is square-shaped in section. Therefore, at the time of injection molding of the housing 1, the holder 3 is aligned with the center of the boss 2 so that the material of the housing 1 fills up the notches 5 and the groove 6. Thus, the housing 1 is integrally fitted with the holder 3, and further, the two members tightly engage with each other to prevent loosening that may be caused by vibration or impact.

The aforementioned collar 4 is engaged under pressure with the outer periphery of the forward end of the holder 3. The collar 4 is made of metal such as aluminum, iron and brass, and comprises a heater holder 4A for holding a heater 7 and a bimetallic member retainer 4B integrally and projectingly provided on the front surface of the heater holder 4A for retaining the bimetallic member 8.

The heater holder 4A is provided in its center with a hole of which inner diameter is sized to receive the forward end of the holder 3 under pressure, and thus the heater holder 4A is engaged with the holder 3 through the hole. The outer periphery of the heater holder 4A has an outer diameter which is sized to be engaged with the heater 7. The heater holder 4A is further provided in its forward end an annular flat heat transferring flange 9 which functions as a medium, so that the heater 7 is held between the outer surface of the heater holder 4A and the rear surface of the heat transferring flange 9.

The bimetallic member retainer 4B is substantially cylindrical, and the cavity in the forward end thereof is blocked by a plate 10 for contact with a bent portion 8A of the inner end of the bimetallic member 8. The bimetallic member retainer 4B further has a slit 11 formed in the diametrical direction, which is sized to receive the bent portion 8A of the bimetallic member 8.

Figure 5:
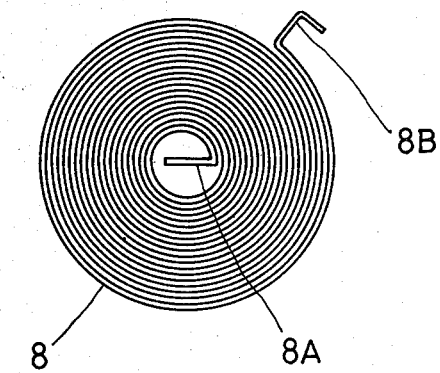
FIG. 5 is a front elevational view of the bimetallic member.
Figure 6:
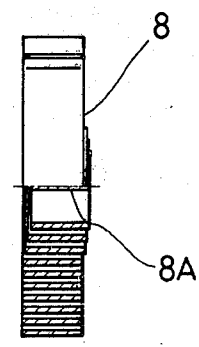
FIG. 6 is a central cross sectional view of the bimetallic member as shown in FIG. 5.

The bimetallic member 8 is an elastic flat strip composed of a plurality of laminated thin metals which are different in thermal expansivity from each other and is coiled in the form of a conical coiled spring as shown in FIGS. 4 and 5. The inner diameter of the center thereof is sized to be engaged with the bimetallic member retainer 4B, and the bent portion 8A is provided on the inner end of the bimetallic member 8 along the diameter of the bimetallic member retainer 4B to be inserted into the slit 11.

On the outer end of the bimetallic member 8, there is provided a hooked portion 8B to be connected with the working lever L. After the bent portion 8A of the bimetallic member 8 is inserted into the slit 11 of the collar 4 against elasticity of the bimetallic member 8, the central opening of the plate 10 communicating with the slit 11 is caulked so that the bent portion 8A is secured to the plate 10. Therefore, the rear end of the bimetallic member 8 is in close contact with the forward end of the heat transferring flange 9 by virtue of its elasticity in the axial direction.

The heater 7 comprises an annular flat body made of a ceramic heat-resisting and electric-insulating material such as alumina porcelain and a heat generating member of tungsten or molybdenum provided within or along the surface of the body, and is connected at one end with a plus terminal 7A and at the other end with a minus terminal 7B.

The heater 7 is engaged with the heater holder 4A of the collar 4, and is pressed against the heat transferring flange 9 by a compression spring 12 interposed between the rear surface of the heater 7 and the inner surface of the housing 1. Thus, the front surface of the heater 7 is in close contact with the rear surface of the heat transferring flange 9 by virtue of spring force of the compression spring 12. The compression spring 12 may be a conical coiled spring as shown in the drawings.

The housing 1 is provided on its outer surface with a cooling member 13 which is substantially C-shaped in section as shown in FIG. 10. The cooling member 13 is formed by a good conductor of heat and electricity such as copper, brass, aluminum and iron, and comprises a body 13A having a substantially C-shaped cross section for embracing the housing 1 along the center line of the outer surface thereof and annular portions 13B inwardly projecting from both ends of the body 13A along the side surfaces of the housing 1 and having a flange 13F provided along the flange 1F. The width of the body 13A is sized to be fitted between the reinforcing ribs 1R, and a center pin 14 having a head is inserted into the central portion of the body 13A. The center pin 14 is made of metal such as iron and brass, and the head thereof is welded to the body 13A of the cooling member 13, and the body thereof is inserted under pressure into the central portion of the holder 3. Therefore, the heat transferred from the heater 7 to the center pin 14 through the heater holder 4A of the collar 4 and the holder 3 is transmitted to the cooling member 13, and is emitted from the surfaces of the body 13A and the annular portions 13B into the atmosphere by radiation and convection, and thus the device according to the present invention is remarkably cooled to prevent overheating of the device during driving of the automobile to which the same is applied and facilitate restoration of the bimetallic member 8 from thermal deformation after stoppage of the automobile.

A connector 15B which is connected at one end to the minus terminal 7B of the heater 7 is connected at the other end to an end portion of the body 13A of the cooling member 13.

Numeral 16 indicates a flange for mounting the device to the body of the automobile. The flange 16 is made of a sheet of metal such as aluminum, iron and brass, and is formed along the outer periphery of the housing 1 to be in contact with the flange 1F of the housing 1 and the flange 13F of the cooling member 13.

Therefore, the minus terminal 7B of the heater 7 is electrically connected to the body of the automobile through the cooling member 13 and the flange 16, namely, grounded to the body. Thus, the cooling member functions also as a ground member.

Numeral 17 indicates a lead wire connected to the plus terminal 7A.

In the aforementioned embodiment of the present invention, the bimetallic member 8 is made in the form of a conical coiled spring, and the bent portion 8A thereof is inserted under pressure into the slit 11 of the bimetallic member retainer 4B of the collar 4 against elasticity of the bimetallic member 8, and thus the bimetallic member 8 is pressed against the heat transfering flange 9 of the heater holder 4A of the collar 4. Therefore, the rear surface of the bimetallic member 8 is in close contact with the front surface of the heat transferring flange 9.

Further, since the heater 7 is pressed against the heat transferring flange 9 by the compression spring 12, the front surface of the heater 7 is in close contact with the rear surface of the heat transferring flange 9. Namely, the heater 7 and the bimetallic member 8 contact with each other in an airtight manner with interposition of the heat transferring flange 9. Therefore, the heat from the heater 7 is directly transferred to the heat transferring flange 9 and to the bimetallic member 8. Thus, the bimetallic member 8 is deformed in response to temperature change of the heater 7 to open and close the choke valve and thereby enables quick opening of the choke valve.

In the aforementioned embodiment, further, the heat transferring flange 9 is interposed between the heater 7 and the bimetallic member 8 to protect the heater 7, and thereby prevents the heater 7, especially the front surface thereof from abrasion by thermal deformation of the bimetallic member 8 and increases durability of the heater 7.

Figure 12:
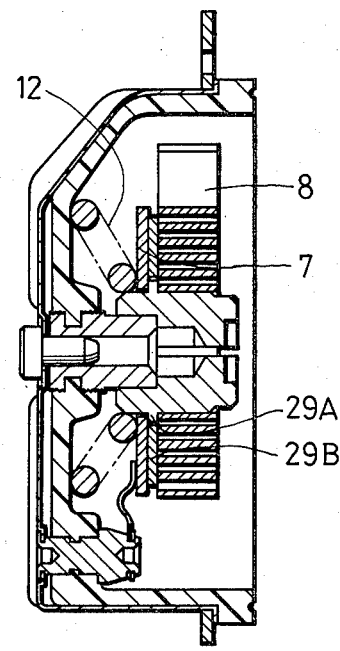
FIGS. 12 to 14 are cross sectional views showing the principal parts of another three embodiments of the device according to the present invention.
Figure 13:
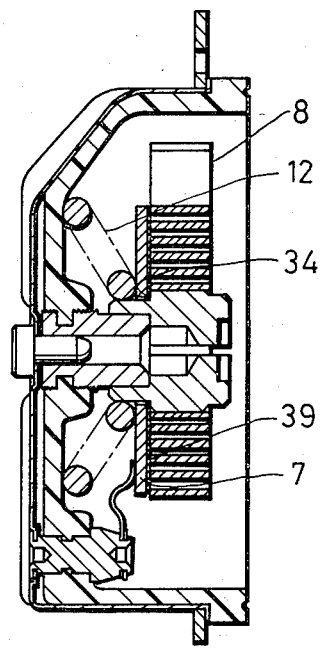
Figure 14:
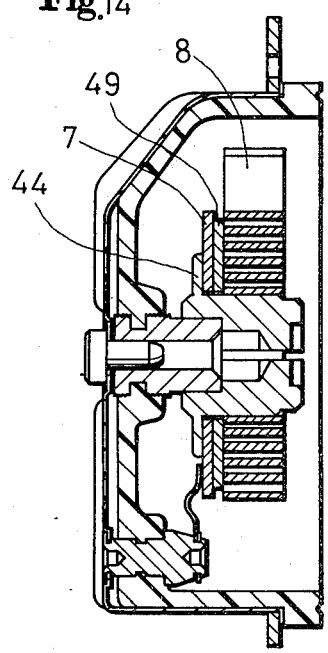

Attention is now drawn to FIGS. 12 to 14 in which another three embodiments of the present invention are shown. Since the three embodiments are basically identical in construction and function with the first embodiment shown in FIGS. 1 to 11, no detailed description would be necessary except the difference from the first embodiment.

In the second embodiment as shown in FIG. 12, no heat transferring flange such as indicated by numeral 9 in the first embodiment is integrally provided with the heater holder 4A of the collar, but the heater holder 4A is integrally provided with a small-diametrical flange 29A so that the bimetallic member 8 is in contact with the front surface of the flange 29A and the heater 7 is in contact with the rear surface thereof, and a heat transferring plate 29B which functions as a medium engagedly encircles the flange 29A. The heat transferring plate 29B is slightly larger in thickness than the flange 29A so that the heat transferring plate 29B comes in close contact with the heater 7 and with the bimetallic member 8. Thus, the heat from the heater 7 is transferred through the heat transferring plate 29B to the bimetallic member 8 so that the bimetallic member 8 is deformed in response to temperature change of the heater 7 to close and open the choke valve.

In the third embodiment as shown in FIG. 13, a member 39 for protecting the surface of the heater 7 and transferring the heat from the heater 7 to the bimetallic member 8 is integrally provided on the front surface of the heater 7 by a method such as coating and glueing.

The heater holder 4A is provided with a stepped portion 34 which is in contact with the front surface of the heater 7, and the heater 7 is fixed by the stepped portion 34 and the compression spring 12.

In the fourth embodiment as shown in FIG. 14, the compression spring 12 is omitted and the heater holder 4A is integrally provided in the outer periphery of its rear portion with an annular flange 44, which functions as a rigid retainer.

Further, a heat transferring plate 49 which is separate from the heater holder 4A is interposed between the heater 7 and the bimetallic member 8. Thus, the heater 7, the heat transferring plate 49 and the bimetallic member 8 are pressed against the front surface of the annular flange 44 by axial spring force of the bimetallic member 8.

While the invention has been described with reference to a few preferred embodiments thereof, it is to be understood that modifications or variations may be easily made without departing from the scope of this invention which is defined by the appended claims.

What is claimed is:

1. A device for automatically regulating a choke valve mounted for variable movement across the air/fuel induction passage in a carburetor of an internal combustion engine, said device comprising:

a housing fixed to the body of the carburetor, a bimetal coil provided in said housing and operably connected to the choke valve shaft urging the choke towards a closed position with a force increasing as a function of decreases in the temperature of the bimetal coil from a predetermined level, an electric heater device located in a fixed state adjacent to said bimetal coil operable to transfer its heat output to said bimetal coil up to its limit to thereby open the choke valve, and a heat conductive member interposed between said bimetal coil and said electric heater device wherein each surface of said heat conductive member is kept in contact with said heater device and the bimetal coil operable to transfer the heat output from said heater device to said bimetal coil by direct heat conduction, said bimetal coil being formed in a conical shape and mounted on a bimetal coil retainer and operable to press said heat conductive member with its compressive spring force.

* * * * *